United States Patent

Fuchs et al.

[11] 4,118,381
[45] Oct. 3, 1978

[54] 1:2 COBALT COMPLEX PHENOL-ACETOACETANILIDE BENZENE DISAZO DYESTUFFS

[75] Inventors: Hermann Fuchs, Kelkheim, Taunus; Klaus Filzinger, Hofheim, Taunus, both of Fed. Rep. of Germany

[73] Assignee: Hoechst Aktiengesellschaft, Frankfurt am Main, Fed. Rep. of Germany

[21] Appl. No.: 765,003

[22] Filed: Feb. 2, 1977

[30] Foreign Application Priority Data

Feb. 4, 1976 [DE] Fed. Rep. of Germany ....... 2604220

[51] Int. Cl.² .............................................. C09B 45/20
[52] U.S. Cl. ................... 260/148; 260/176; 260/205; 260/206; 260/207; 260/207.1
[58] Field of Search .............................. 260/148, 176

[56] References Cited

U.S. PATENT DOCUMENTS

| 2,477,487 | 7/1949 | Kopp et al. ................... 260/176 X |
| 3,420,812 | 1/1969 | Langbein et al. ................ 260/148 |

*Primary Examiner*—Charles F. Warren
*Attorney, Agent, or Firm*—Curtis, Morris & Safford

[57] ABSTRACT

Valuable 1:2-cobalt complex dyestuffs of the disazo compound of formula (1)

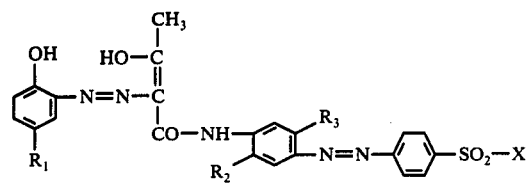

had been found, in which $R_1$ is hydrogen, halogen, nitro, lower alkyl or lower alkoxy, $R_2$ is hydrogen, lower alkyl or lower alkoxy, $R_3$ is hydrogen, lower alkyl or lower alkoxy, X is hydroxy or β-sulfoethyl or a group of the formula

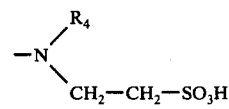

wherein $R_4$ is hydrogen or lower alkyl. The novel dyestuffs are well suitable for the dyeing of natural and synthetic polyamide fibres, especially in admixture with hydrophobic fibres, and also especially advantageously with other 1:2-chromium or 1:2 cobalt complex dyestuffs containing one or two sulfonic acid groups per dyestuff molecule, and yield even, strong dyeings of high fastness to wet processing and to use as well as to light. The novel cobalt complex dyestuff can be prepared by cobalting the above disazo compound (1) by means of a cobalt yielding agent.

1 Claim, No Drawings

1:2 COBALT COMPLEX PHENOL-ACETOACETANILIDE BENZENE DISAZO DYESTUFFS

Novel 1:2 cobalt complexes of diazo compounds of the general formula (1) have been found

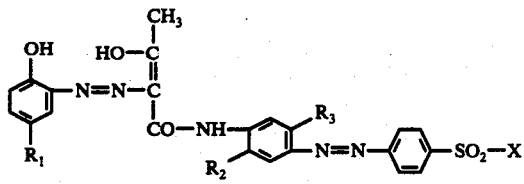

wherein $R_1$ is hydrogen, halogen, such as chlorine or bromine, preferably chlorine, a nitro group, a lower alkyl group such as a methyl or ethyl, preferably a methyl group, or a lower alkoxy group, $R_2$ is hydrogen, a lower alkyl or alkoxy group such as a methyl, ethyl, methoxy, ethoxy group, preferably methoxy and ethoxy group, $R_3$ stands for hydrogen, a lower alkyl or a lower alkoxy group, beside hydrogen preferably the methyl, methoxy and ethoxy group, and X is the hydroxy or the β-sulfo-ethyl group or the group of the formula

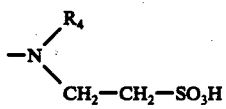

wherein $R_4$ stands for a hydrogen atom or a lower alkyl group such as a methyl group.

The term "lower" means especially a content of 1–4 carbon atoms.

The novel dyestuffs are preferably available and used in the form of their sodium, potassium or ammonium salts.

They are prepared according to the invention by reacting an amino azo compound of the general formula (2)

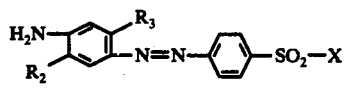

wherein $R_2$, $R_3$ and X have the above meanings, with diketene in an aqueous solution at a temperature of 20° to 90° C., preferably of 40° to 60° C., and a pH value between 3 and 9, preferably 5 and 6, coupling the obtained N-acetoacetyl compound of the general formula (3)

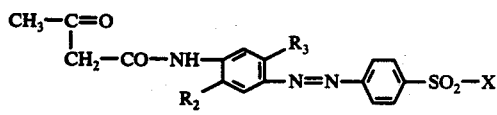

wherein $R_2$, $R_3$ and X have the above meanings, with a diazotized amine of the general formula (4)

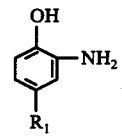

wherein $R_1$ has the above meanings, at a temperature of −10° to +40° C. and a pH value of 7 to 10, preferably 8 to 9, to obtain a disazo compound of the general formula (1), and subsequently metallizing this disazo compound with a cobalt complexing agent at a temperature of from 60° to 145° C., for example of from 60° to 100°–105° C. under normal pressure or of from 105° to 145° C. under pressure, and at a pH value of from 5.0 to 10, preferably 5.5 to 7.5, to obtain the 1:2 cobalt complex dyestuff of the invention. Metallization is preferably carried out in an aqueous medium.

As cobalt complexing agents there are preferably suitable cobalt salts of inorganic or organic acids, for example cobalt carbonate, cobalt hydroxycarbonate, cobalt acetate and cobalt sulfate. Cobaltation may be effected in the presence of an acid-binding agent such as a salt oxide or hydroxide of an alkali metal or of an alkaline salt of the alkali metals, such as sodium or potassium acetate, sodium or potassium carbonate or hydrogencarbonate, sodium or potassium hydroxide.

The cobalt complex dyestuffs thus prepared may be isolated from their preparation solutions by salting out with sodium or potassium chloride or by spray-drying. The novel dyestuffs may be used according to the invention for the dyeing of natural and synthetic polyamide fibres, as for example wool, silk and polyamides of ε-caprolactame, of hexamethylene diamine and adipic acid or of ω-amino-undecylic acid. They may be preferably used for the dyeing of these fibres in mixture with hydrophobic fibres, as for example, of wool in mixtures of wool and polyester fibres, with an excellent resist effect of the hydrophobic fibre portion.

The novel dyestuffs may be preferably used in the form of their alkali metal salts, such as the sodium, potassium or ammonium salts. They may also be used in mixture with other 1:2-cobalt- or -chromium complex dyestuffs which contain one or two sulfonic acid groups per dyestuff molecule. Dyeing is effected in a known and usual manner for metal complex dyestuffs. Dyeing is preferably carried out from an acidic to neutral bath, preferably in the pH range of from 4.0 to 6.5 and at a temperature of from 90° to 105° C.; usual dyeing auxiliaries, as for example oxethylation products of a fatty amine or of a fatty alcohol and usual buffer substances such as a sodium phosphate, sodium acetate, sodium formiate, if desired in mixture with the corresponding acids, for stabilization of the dyeing pH value may be added to the dyeing bath. For example, by addition of an acid, for example formic acid or acetic acid or of a mineral acid, to the dyebath which contains an alkali salt of the formic acid, the acetic acid or an other organic acid, a pH value of the dyebath may be adjusted which accords with the optimum dyeing condition in respect to the dyestuff concentration used and to the desired color intensity on the fibre.

For the local dyeing by printing there are used printing pastes which contain the usual thickeners and printing auxiliaries as well as a salt of a weak base and of a strong mineral acid or of an organic acid, for example ammonium sulfate or ammonium tartrate. The printed fabrics are dried and then treated for a short time with hot air or steam.

Thus, orange and golden yellow to yellow brown shades are obtained on natural and synthetic polyamide fibres with the novel dyestuffs of the invention; the dyeings have good to very good fastness properties, as for example fastness to washing at washing processes from 20° to 60° C., for example 40° and 60° C. according to DIN 54014, fastness to water (under severe conditions), fastness to chlorinated water, fastness to bleaching, to spotting, fastness to acid and alkaline fulling, fastness to steaming and hot water, fastness to formaldehyde, to cross-dyeing, fastness to acid chlorination of wool, to alkaline and acid perspiration, furthermore a good fastness to solvents, to carbonizing and decatizing as well as an excellent fastness to light in the xenotest and daylight test.

The following Examples illustrate the invention. Parts and percentages are by weight.

EXAMPLE 1

27.7 Parts of 4-amino-azobenzene-4'-sulfonic acid are dissolved in 150 parts of water and 4 parts of sodium hydroxide at a pH value of 6 to 7 and a temperature of 50° to 60° C. Within 30 minutes, 9.25 parts of diketene are added dropwise; the reaction mixture is stirred for another 2 hours at 50°-60° C. and then allowed to cool a temperature of 15° to 25° C. The suspension thus obtained of N-acetoacetyl-4-amino-azobenzene-4'-sulfonic acid is used directly for the subsequent coupling process.

15.4 Parts of 4-nitro-2-aminophenol are dissolved with 25 parts of an aqueous 31% hydrochloric acid in 150 parts of water; after addition of 50 parts of ice, diazotation is carried out by addition of 17.3 parts of an aqueous 40% sodium nitrite solution. After 30 minutes a small amount of amidosulfonic acid is added in order to destroy nitrous acid.

The suspension of the diazo and coupling components thus obtained are combined; the pH is adjusted to a value of 8.0–9.0 with sodium carbonate. Coupling is finished at room temperature after 6 hours. The pH value of the dyestuffs suspension is adjusted with an aqueous 31% hydrochloric acid at first to 7.0, then with acetic acid to 6.0. Then 6.35 parts of cobalt hydroxide carbonate (with a content of 47% of cobalt) are added, and the whole is refluxed for 4 hours. The 1:2 cobalt complex formed is separated by salting out with sodium chloride or isolated by spray-drying. The dyestuff has in the form of the free acid the formula

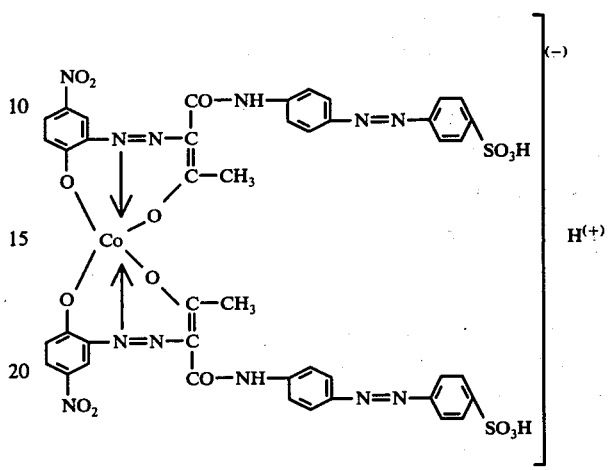

Dyeing Example

100 Parts of a woolen fabric are introduced into a dyebath of 40° C. consisting of 1.0 part of the cobalt complex dyestuff of Example 1, 0.15 part of an addition product of 12 mols of ethylene oxide to 1 mole of stearyl amine, 2 parts of ammonium acetate and 2 parts of an aqueous 60% acetic acid in 3000 parts of water. The temperature of the dyebath is increased within 30 minutes to the boiling temperature and then dyeing is continued at 100° C. for 60 minutes. Then the fabric is after-treated and terminated as usual. An orange even dyeing which has good to very good fastness properties to wetting processes and an excellent fastness to light is obtained.

If the woolen fabric is replaced by 100 parts of polycaprolactame fabric, a dyeing is obtained which has also good fastness properties to use and processing and an excellent fastness to light.

EXAMPLE 2

If in Example 1 the 4-nitro-2-aminophenol is replaced by 14.4 parts of 4-chloro-2-aminophenol and the 4-amino-azobenzene-4'-sulfonic acid by 42.9 parts of 4-amino-3-methoxy-azobenzene-4'-sulfonic acid-N-methyl-N-$\beta$-sulfo-ethylamide, a dyestuff is obtained under otherwise identical reaction conditions, which corresponds in the free acid form to the following formula

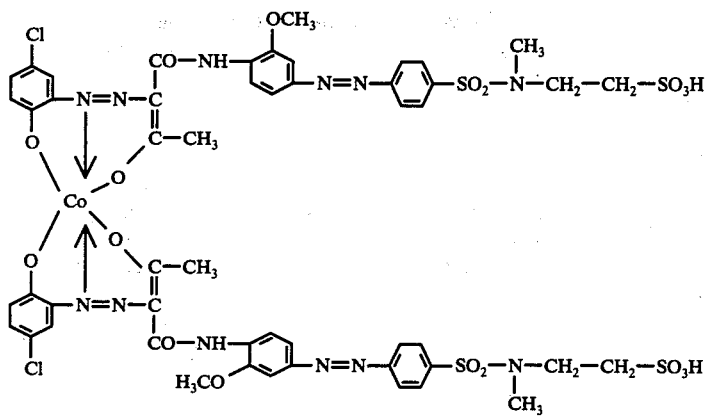

Dyeing Example

100 Parts of a polycaprolactame fabric are introduced into a dyeing bath of 40° C. which contains 1.5 parts of the cobalt complex dyestuff of Example 2, 0.15 part of an addition product of 12 mols of ethylene oxide to 1 mol of stearyl amine, 2.0 parts of ammonium acetate and 2.0 parts of an aqueous 60% acetic acid in 3000 parts of water. The temperature of the dyebath is increased within 15 minutes to 98°–100° C., and the whole is dyed for 60 minutes at 100° C. After completing as usual, a brownish yellow dyeing having good to very good fastnesses to wetting and an excellent fastness to light, is obtained.

If the polycaprolactame fabric is replaced by 100 parts of wool a dyeing having also good to very good general properties to use and processing and an excellent fastness to light is obtained.

EXAMPLE 3

41.3 Parts of 4-amino-5-methoxy-2-methyl-azobenzene-4'-sulfoethyl-sulfone are dissolved in 200 parts of water and 12.1 parts of an aqueous 33% sodium hydroxide solution at a pH value of 6 to 7 and a temperature of 50° to 60° C. 10.1 Parts of diketene are added dropwise within 30 minutes; stirring of the reaction mixture is continued for another 2 hours at 50°–60° C. After cooling to room temperature the N-acetoacetyl-4-amino-5-methoxy-2-methyl-azobenzene-4'-sulfoethylsulfone is suction-filtered, washed with a small amount of water and used for the following coupling process.

For this purpose 12.3 parts of 3-amino-4-hydroxy-toluene are dissolved in 150 parts of water and 25 parts of an aqueous 31% hydrochloric acid; 50 parts of ice were added, and the amine compound diazotized by addition of 17.3 parts of an aqueous 40% sodium nitrite solution. After 30 minutes the whole is mixed with a small amount of amidosulfonic acid in order to destroy nitrous acid in excess. The previously prepared moist acetoacetyl compound is added, and the pH value adjusted to 8.5–9.0 with calcinated sodium carbonate. Coupling is finished at room temperature after 6 hours. The pH value of the disazo compound suspension is adjusted to 6.0 with an aqueous 31% hydrochloric acid. 14.1 Parts of crystallized cobalt sulfate and 13.6 parts of crystallized sodium acetate are added, and the mixture is heated in the closed vessel for 2 hours at a temperature of 130°–140° C.

The 1:2 cobalt complex is isolated by salting out with sodium chloride or by spray drying. The dyestuff has in the form of the free acid the formula

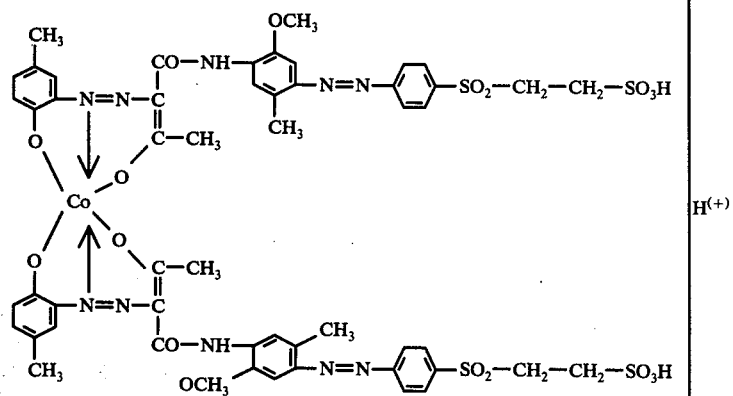

Dyeing Example

Polyamide carpet yarn is padded up to a liquor pick-up of 100% with a padding liquor containing 10 parts of the dyestuff of Example 3, 5 parts of a locust bean fluor preparation, 4 parts of an addition product of 8 mols of ethylene oxide to 1 mol of isotridecyl alcohol and 10 parts of an aqueous 60% acetic acid in 1000 parts of liquor; then it is steamed for 6 minutes at 100°–102° C. and then rinsed cold. The dyeing obtained has very good general fastness properties to use and an excellent fastness to light.

EXAMPLE 4

If in Example 3 the 4-amino-5-methoxy-3-methyl-4'-sulfoethylsulfone is replaced by 33.7 parts of 4-amino-2,5-dimethoxy-azobenzene-4'-sulfonic acid and the 3-amino-4-hydroxy-toluene by 15.4 parts of 4-nitro-2-aminophenol, a dyestuff is obtained under otherwise identical reaction conditions, which corresponds in the form of the free acid the following formula

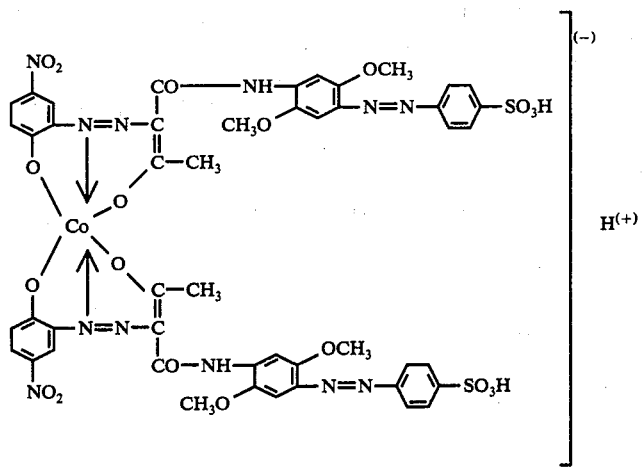

Dyeing Example

100 Parts of wool flock are introduced into a dyebath of 40° C. consisting of 1.0 part of the cobalt complex dyestuff of Example 4, 0.15 parts of an additions product of 12 mols of ethylene oxide to 1 mol of stearyl amine, 2 parts of ammonium acetate and 2 parts of an aqueous 60% acetic acid in 3000 parts of water. The temperature of the dyebath is increased within 30 minutes to the boiling temperature, and dyeing is continued for 60 minutes at 100° C. After completing as usual an even yellowish brown dyeing having good to very good fastness properties to wet processing and an excellent fastness to light.

EXAMPLE 5

39.8 Parts of 4-amino-2-methyl-azobenzene-4'-β-sulfoethylsulfonamide are dissolved in 200 parts of water and 12.1 parts of an aqueous 33% sodium hydroxide solution at a pH value of 6–7 and a temperature of 50°–60° C. 10.1 Parts of diketene are added dropwise within 30 minutes; stirring of the reaction mixture is continued for another 2 hours at 50°–60° C. After cooling, a suspension of N-acetoacetyl-4-amino-2-methylazobenzene-4'-sulfoethyl-sulfonamide is obtained which is subsequently used for the coupling process.

15.4 Parts of 4-nitro-2-aminophenol are dissolved with 25 parts of an aqueous 31% hydrochloric acid in 150 parts of water; 50 parts of ice are added, and diazotation is effected by addition of 17.3 parts of an aqueous 40% sodium nitrite solution. After 30 minutes a small amount of amidosulfonic acid is added in order to destroy nitrous acid.

The diazo and coupling suspension obtained are combined, and a pH value of 8.0 to 9.0 is adjusted with calcinated sodium carbonate. The coupling is finished at room temperature after 6 hours. The pH value of the dyestuff suspension is adjusted with a 31% hydrochloric acid at first to 7.0, then with acetic acid to 6.0; then 6.35 parts of cobalt hydroxide carbonate having a content of 47% of cobalt, are added, and the whole is refluxed for 4 hours. The 1:2 cobalt complex obtained is separated by salting out with sodium chloride or isolated by spray drying. The dyestuff corresponds in the form of the free acid to the formula

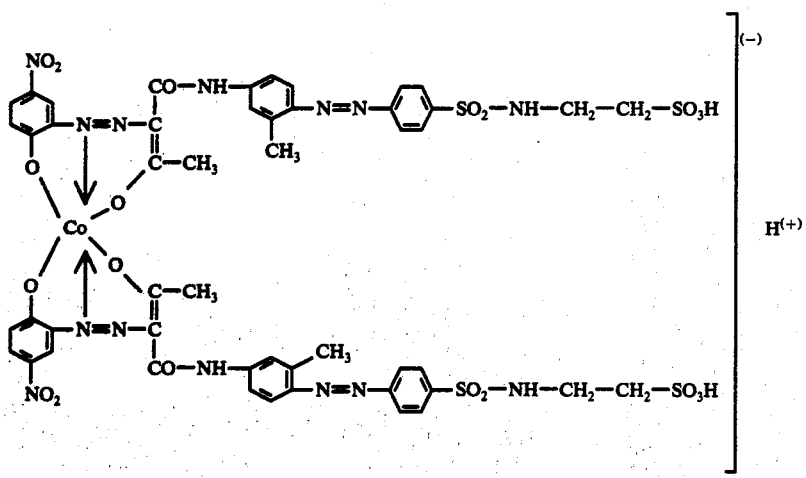

Dyeing Example

100 Parts of a woolen fabric are introduced into a dyebath of 40° C., which contains 0.15 parts of the addition product of 12 mols of ethylene oxide to 1 mol of stearyl amine, 2 parts of ammonium acetate and 2 parts of an aqueous 60% acetic acid in 3000 parts of water. The temperature of the dyebath is increased within 30 minutes to boiling temperature, and dyeing is continued for 60 minutes at 100° C. After completing as usual a brownish yellow dyeing having a good evenness, good to very good fastness properties to wet processing and an excellent fastness to light is obtained.

If the woolen fabric is replaced by 100 parts of polycaprolactame, a dyeing is obtained which also has good to very good general fastness properties to use and processing and an excellent fastness to light.

The following Table contains further dyestuffs of the invention which may be and had been prepared in analogy to the above Examples.

| Ex No. | 1:2 cobalt complex of the dyestuff | shade of the wool dyeing |
|---|---|---|
| 10 | 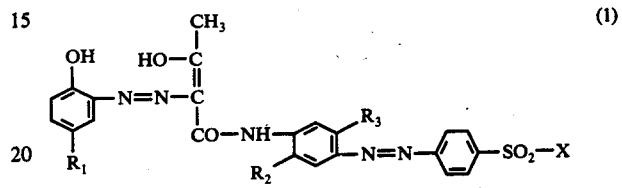 | orange |

The dyestuffs of the Examples 1, 2, 3 and 6 are preferred.

What we claim is:

1. A 1:2-cobalt complex disazo dyestuff of a disazo compound of the general formula

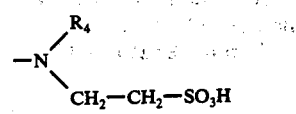 (1)

wherein $R_1$ is hydrogen, halogen, nitro, lower alkyl or lower alkoxy, $R_2$ is hydrogen, lower alkyl or lower alkoxy, $R_3$ is hydrogen, lower alkyl or lower alkoxy and X is hydroxy or β-sulfoethyl or a group of the formula $$-N\begin{array}{c}R_4\\CH_2-CH_2-SO_3H\end{array}$$

wherein $R_4$ is hydrogen or lower alkyl.

* * * * *